(12) United States Patent
Dong et al.

(10) Patent No.: US 7,846,608 B2
(45) Date of Patent: Dec. 7, 2010

(54) FLOW-FIELD PLATE AND FUEL CELL STACK USING THE SAME

(75) Inventors: Junqing Dong, Guangdong (CN); Yong Zhou, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 11/910,865

(22) PCT Filed: Mar. 29, 2006

(86) PCT No.: PCT/CN2006/000541
§ 371 (c)(1),
(2), (4) Date: Dec. 22, 2008

(87) PCT Pub. No.: WO2006/105715
PCT Pub. Date: Oct. 12, 2006

(65) Prior Publication Data
US 2009/0214931 A1    Aug. 27, 2009

(30) Foreign Application Priority Data

| Apr. 5, 2005 | (CN) | ......................... 2005 1 0 063142 |
| Aug. 16, 2005 | (CN) | ......................... 2005 1 0 090775 |
| Aug. 16, 2005 | (CN) | ......................... 2005 1 0 090776 |
| Oct. 19, 2005 | (CN) | ......................... 2005 1 0 109223 |
| Oct. 19, 2005 | (CN) | ......................... 2005 1 0 109224 |

(51) Int. Cl.
*H01M 2/38* (2006.01)
*H01M 2/40* (2006.01)
*H01M 8/24* (2006.01)

(52) U.S. Cl. .......................... 429/457; 429/460; 429/544

(58) Field of Classification Search ................... 429/30, 429/32, 34, 33, 37, 38, 39, 66; 204/263, 204/252, 294; *H01M 8/02, 8/10, 8/24*
See application file for complete search history.

(56) References Cited

U.S. PATENT DOCUMENTS 5,108,849 A    4/1992    Watkins et al.
(Continued)

FOREIGN PATENT DOCUMENTS

| CN | 1242614 A | 1/2000 |
| CN | 2524379 Y | 12/2002 |

(Continued)

OTHER PUBLICATIONS

PCT International Search Report for PCT Counterpart Application No. PCT/CN2006/000541 containing Communication relating to the Results of the Partial International Search Report, 2 pgs., (Jun. 15, 2006).

PCT International Search Report for PCT Counterpart Application No. PCT/CN2006/000540 containing Communication relating to the Results of the Partial International Search Report, 2 pgs., (Jun. 15, 2006).

*Primary Examiner*—Jennifer K Michener
*Assistant Examiner*—Heng M Chan
(74) *Attorney, Agent, or Firm*—Blakely, Sokoloff, Taylor & Zafman LLP (57) ABSTRACT

Disclosed is a flow-field plate and fuel cell stack using the same. The flow-field plate of the present invention comprises a center hole (5) formed at the center of the flow-field plate, a inlet (6) and a outlet (7) formed on two positions near the outer edge of the flow-field plate, and flow grooves extending radially from the center hole (5) on one side of the flow-field plate. Since the flow-field plate according to the present invention may comprise flow grooves extending radially and having short flow path, which is benefit for reactants diffusion, there is no "dead-end" on the flow-field plate and reactants may distribute uniformly to each part of flow-field plate. Furthermore, resultants generated from reaction, such as water, nitrogen, carbon dioxide, etc., may be discharged in time and not accumulate on flow-field plate. Therefore, the reactant utilization ratio, the fuel cell performances and its service life may be improved.

16 Claims, 7 Drawing Sheets

U.S. PATENT DOCUMENTS

| | | |
|---|---|---|
| 6,270,917 B1 * | 8/2001 | Maeda et al. ............... 429/37 |
| 6,348,280 B1 * | 2/2002 | Maeda et al. ............... 429/38 |
| 6,541,145 B2 | 4/2003 | Wilkinson et al. |
| 6,586,128 B1 | 7/2003 | Johnson et al. |
| 2003/0180601 A1 * | 9/2003 | Naruse et al. ............... 429/38 |
| 2004/0142225 A1 * | 7/2004 | Turpin et al. ............... 429/38 |

FOREIGN PATENT DOCUMENTS

| | | |
|---|---|---|
| CN | 1405909 A | 3/2003 |
| CN | 2552171 Y | 5/2003 |
| CN | 1449066 A | 10/2003 |
| CN | 1507666 A | 6/2004 |

* cited by examiner

(Prior Art)

FLOW-FIELD PLATE AND FUEL CELL STACK USING THE SAME

CROSS-REFERENCE TO OTHER APPLICATIONS

This is a National Phase of International Application No. PCT/CN2006/000541, filed on Mar. 29, 2006, which claims priority from Chinese Patent Application No. 200510063142.3, filed on Apr. 5, 2005; Chinese Patent Application No. 200510090776.8, filed on Aug. 16, 2005; Chinese Patent Application No. 200510090775.3, filed on Aug. 16, 2005; Chinese Patent Application No. 200510109223.2, filed on Oct. 19, 2005; and Chinese Patent Application No. 200510109224.7, filed on Oct. 19, 2005.

FIELD OF INVENTION

The present invention relates to a fuel cell, and more particularly to a flow-field plate and fuel cell stack using the same.

BACKGROUND

A fuel cell is a device for generating power that converts chemical energy from a fuel and oxidant directly into electrical energy. It has such advantages as higher efficiency, less pollution and lower noise. A fuel cell may be a single fuel cell, or a fuel cell stack composed of a plurality of single fuel cells.

Figure 1:
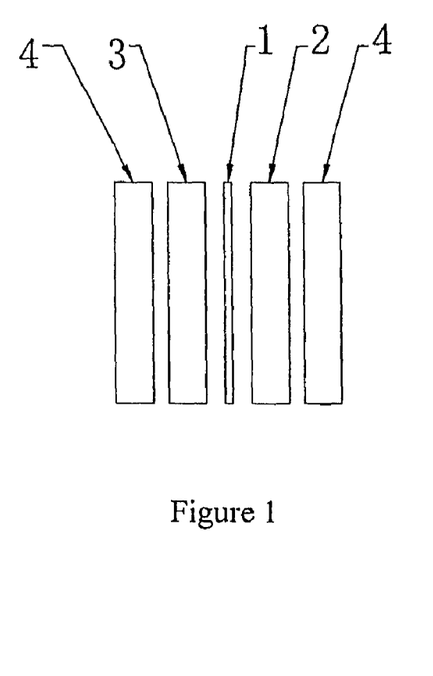
FIG. 1 is a schematic view illustrating an electrode structure of a single fuel cell.

A single fuel cell generally comprises a proton exchange membrane (PEM) 1, an anode 2, a cathode 3 and a conductive polar plate 4, as shown in FIG. 1.

The PEM 1 is a non-waterproof and gasproof type of semi-permeable membrane that water may permeate through and gas may not permeate through, and has the property of proton conductivity. Furthermore, PEM 1 can prevent the explosion of fuel and oxidant due to their mixing.

The anode 2 is an electrode for gas diffusion. Its supporting material generally comprise conductive carbon fiber or carbon fabric. A catalyst for catalyzing the anode reaction is provided between the anode 2 and PEM 1. The anode catalyst typically includes platinum powder, platinum alloy powder, platinum powder carried on a carrier or platinum alloy powder carried on a carrier. The platinum alloy may contain platinum and at least one selected from the group consisting of ruthenium, tin, iridium, osmium and rhenium. The carrier is conductive and has a higher specific surface area, such as active carbon.

The cathode 3 is also an electrode for gas diffusion. Its constitution is similar to that of the anode, except that a catalyst provided between the cathode 3 and PEM 1 is used for catalyzing the cathode reaction. The cathode catalyst typically includes platinum powder and platinum powder carried on a carrier.

The conductive polar plate 4 is provided on the outside of anode 2 and cathode 3, and may be made from graphite or metal.

In a fuel cell, the oxidant generally may be air or oxygen, and the fuel may be hydrogen, methanol or ethanol, etc. For example, in the case of the fuel cell using methanol as fuel and air as oxidant, the following reactions take place during their electrochemical reaction:

Anode $CH_3OH+H_2O \rightarrow CO_2+6H^++6e$ (1)

Cathode $3/2O_2+6H^++6e \rightarrow 3H_2O$ (2)

The following overall reaction can be obtained from the above reactions on the anode and cathode:

$CH_3OH+3/2O_2 \rightarrow CO_2+2H_2O$ (3)

A potential difference between the anode 2 and the cathode 3 is generated by the electrochemical reaction between these two electrodes. Electrons generated from the anode 2 are captured by the cathode 3 through the conductive polar plate 4 located on the outside of the anode 2 and external conductive body, while protons generated from the anode 2 are transferred directly to the cathode 3 through PEM 1, so that this allows current generation. The voltage resulted from a single fuel cell during a normal operation is within the range from 0.3V to 1.0V. In practical applications, single fuel cells are usually connected in series to form a fuel cell stack in order to provide a higher voltage and power.

A flow-field plate is one of key parts in a fuel cell because the flow state of reactants and resultants in flow field depends on the structure of flow-field plate in a fuel cell. To sufficiently and uniformly provide reactants to electrodes and discharge reaction resultants in time is very important to ensure a normal operation of a fuel cell. Therefore, if reactants could not distribute uniformly on electrodes, reaction on electrodes would be heterogeneous. This will make a fuel cell local overheated due to the resulted heterogeneous distribution of current density, and then lower the fuel cell performances and shorten its service life. Furthermore, water generated from reaction would accumulate on the cathode with reaction going on if it could not be discharged in time. This will result that (1) reactants are difficult to contact with the catalyst due to the presence of water around the catalyst, i.e. "water-submerged electrode", which directly influences fuel cell performances; (2) material transferring resistance for reactants across diffusion layer to catalysis layer is increased, which decreases the output power of a fuel cell; (3) parts of PEM will expand occasionally due to water accumulation.

Figure 2:
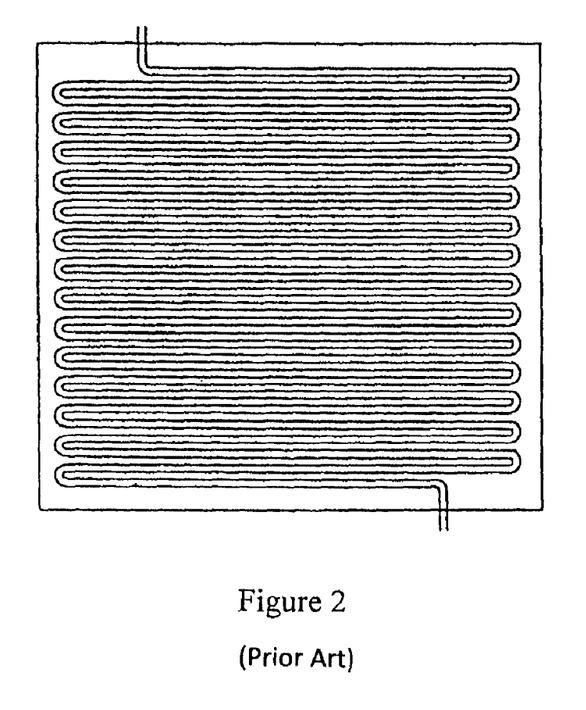
FIG. 2 is a schematic view illustrating a flow-field plate disclosed in CN1405909A.

CN1405909A disclosed a flow-field plate of fuel cell. As shown in FIG. 2, although a plurality of flow grooves extending parallel were formed on the flow-field plate to solve problems on reactants distribution and resultants discharge, its effects were not satisfied and some of problems still exist.

SUMMARY OF THE INVENTION

Accordingly, an object of the present invention is to provide a flow-field plate allowing reactants distribute very uniformly and resultants discharge in time, so that problems on reactants diffusion and resultants discharge can be efficiently solved.

Another object of the present invention is to provide a fuel cell stack using said flow-field plate.

The flow-field plate of the present invention comprises a center hole formed at the center of flow-field plate, a inlet and a outlet formed on two positions near the outer edge of flow-field plate, and flow grooves extending radially from the center hole on one side of flow-field plate.

The fuel cell stack of the present invention comprises a flow-field plate, wherein the flow-field plate comprises a center hole formed at the center of flow-field plate, a inlet and a outlet formed on two positions near the outer edge of flow-field plate, and flow grooves extending radially from the center hole on one side of flow-field plate.

The flow-field plate according to the present invention comprises flow grooves extending radially and having short flow path, which is benefit for reactants diffusion. Thus, there is no "dead-end" on the flow-field plate, and reactants may distribute uniformly to each part of flow-field plate. Furthermore, resultants generated from reaction, such as water, nitrogen, carbon dioxide, etc., may be discharged in time and not accumulate on flow-field plate. Therefore, the reactant utilization ratio, the fuel cell performances and its service life may be improved.

DETAILED DESCRIPTION OF THE PREFERRED EMBODIMENTS

Now, preferred embodiments of the present invention will be described in detail with reference to the accompanying drawings.

The flow-field plate 19 of the present invention comprises a center hole 5 formed at the center of flow-field plate, a inlet 6 and a outlet 7 formed on two positions near the outer edge of flow-field plate, and flow grooves extending radially from the center hole 5 on one side of flow-field plate.

The flow-field plate 19 may be made from conductive materials, such as graphite and metal, e.g. Ti, Nb, Al, Cu, stainless steel, Au and Ag. The flow-field plate may be surface treated to prevent it from corrosion. For example, the flow-field plate may be treated at a high temperature in nitrogen to form a layer of metal nitrides on its surface, which has the effect of corrosion resistance. Alternatively, the flow-field plate may be made from composite material of metal and plastic. The flow-field plate 19 may have various shapes, such as circle, ellipse or polygon, preferably circle, rectangle or ellipse. The center hole 5, inlet 6 and outlet 7 may also be various shapes, such as circle, ellipse or polygon, preferably circle, hexagon or square. Furthermore, the size of the center hole, inlet and outlet may be determined as desired as long as it could meet the flow of oxidant or fuel.

Preferably, the positions of inlet 6 and outlet 7 are symmetrical with respect to the center hole 5. The flow grooves are linear type or serpentine type. The ratio of the total area of all flow grooves bottom on the side of flow-field plate to the entire surface area of the flow-field plate ranges between 1/3 and 4/5. The ratio of the depth of flow grooves on the side of flow-field plate to the thickness of flow-field plate ranges between 1/5 and 1/2.

Preferably, the flow-field plate 19 further comprises seal members 8 placed respectively around the inlet 6 and outlet 7 on the side of the flow-field plate 19 having flow grooves extending radially from the center hole. The seal member 8 may be made from various elastic material, for example, at least one selected from the group consisting of osmotic sol plastic, rubber, resin, polyurethane, polyester, polyimide and foam material.

Figure 3:
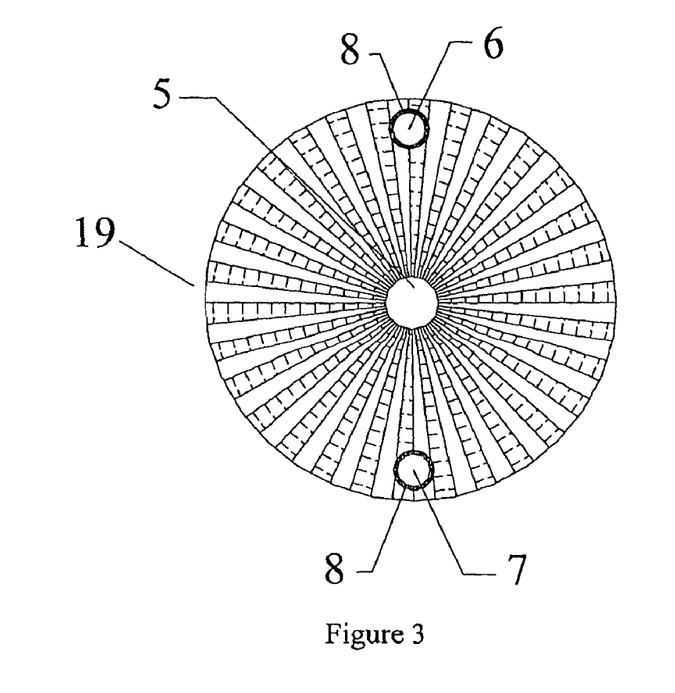
FIG. 3 is a schematic view illustrating a flow-field plate according to the present invention.

According to a first embodiment of the present invention, the flow-field plate 19 is circular, as shown in FIG. 3. The flow grooves extending radially in a linear form from the center hole are provided on one side of flow-field plate. The center hole 5, inlet 6 and outlet 7 are all circular. The inlet 6 and outlet 7 locate respectively on two positions along a diameter of circular flow-field plate and near the outer edge of flow-field plate, wherein the two positions are symmetrical with respect to the center hole 5. The ratio of the total area of all flow grooves bottom on the side of flow-field plate to the entire surface area of the flow-field plate is 1/3. The ratio of the depth of flow grooves on the side of flow-field plate to the thickness of flow-field plate is 1/4.

Figure 4:
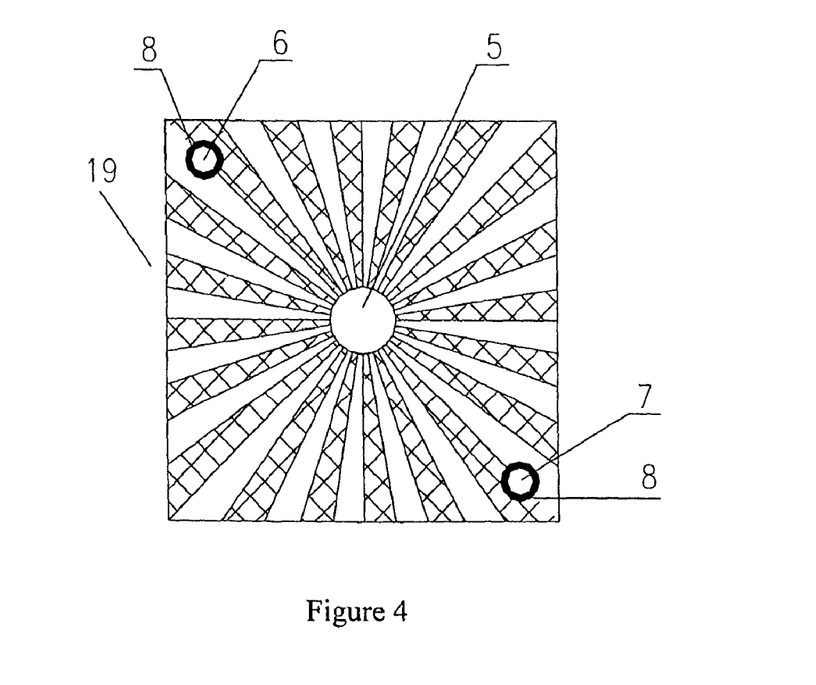
FIG. 4 is a schematic view illustrating a flow-field plate according to the present invention.

According to a second embodiment of the present invention, the flow-field plate 19 is rectangular, as shown in FIG. 4. The flow grooves extending radially in a linear form from the center hole are provided on one side of flow-field plate. The center hole 5, inlet 6 and outlet 7 are all circular. The inlet 6 and outlet 7 locate respectively on two positions along a diagonal of rectangular flow-field plate and near the outer edge of flow-field plate, wherein the two positions are symmetrical with respect to the center hole 5. The ratio of the total area of all flow grooves bottom on the side of flow-field plate to the entire surface area of the flow-field plate is 3/5. The ratio of the depth of flow grooves on the side of flow-field plate to the thickness of flow-field plate is 1/2.

Figure 5:
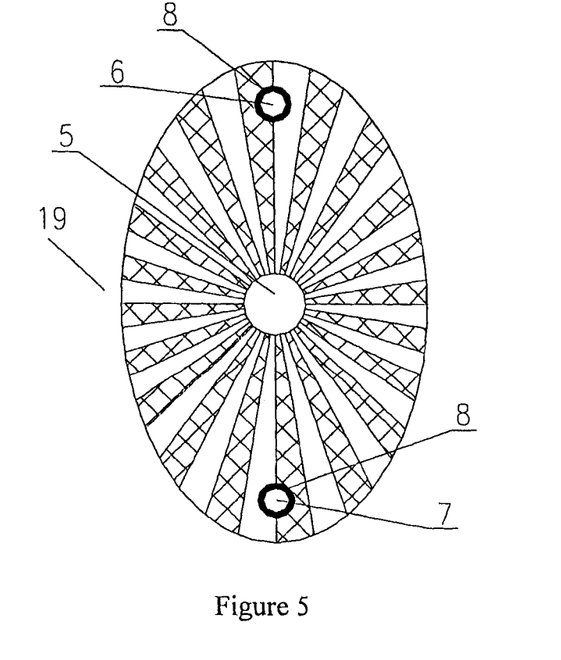
FIG. 5 is a schematic view illustrating a flow-field plate according to the present invention.

According to a third embodiment of the present invention, the flow-field plate 19 is elliptical, as shown in FIG. 5. The flow grooves extending radially in a linear form from the center hole are provided on one side of flow-field plate. The center hole 5, inlet 6 and outlet 7 are all circular. The inlet 6 and outlet 7 locate respectively on two positions along the long axis of elliptical flow-field plate and near the outer edge of flow-field plate, wherein the two positions are symmetrical with respect to the center hole 5. The ratio of the total area of all flow grooves bottom on the side of flow-field plate to the entire surface area of the flow-field plate is 1/2. The ratio of the depth of flow grooves on the side of flow-field plate to the thickness of flow-field plate is 1/3.

The fuel cell stack of the present invention comprises a flow-field plate, wherein the flow-field plate is the flow-field plate 19 according to the present invention. That is, the flow-field plate 19 comprises a center hole 5 formed at the center of flow-field plate, a inlet 6 and a outlet 7 formed on two positions near the outer edge of flow-field plate, and flow grooves extending radially from the center hole 5 on one side of flow-field plate 19.

Figure 6:
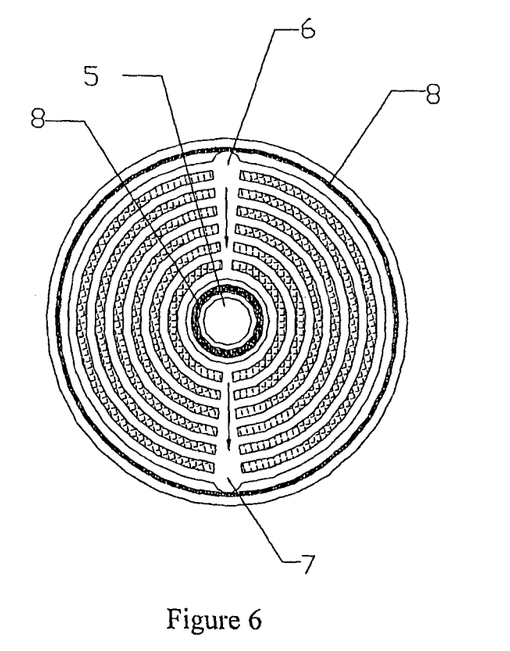
FIG. 6 is a schematic view illustrating a flow-field plate according to the present invention.

Preferably, the other side of the flow-field plate 19 comprises flow grooves that distribute around the center hole 5 and communicate with the inlet 6 and outlet 7 in an arc or angled-line form, as shown in FIG. 6. More preferably, the ratio of the total area of all flow grooves bottom on the other side of flow-field plate to the entire surface area of the flow-field plate ranges between 1/3 and 4/5. The ratio of the depth of flow grooves on the other side of flow-field plate to the thickness of flow-field plate ranges between 1/5 and 1/2.

Figure 7:
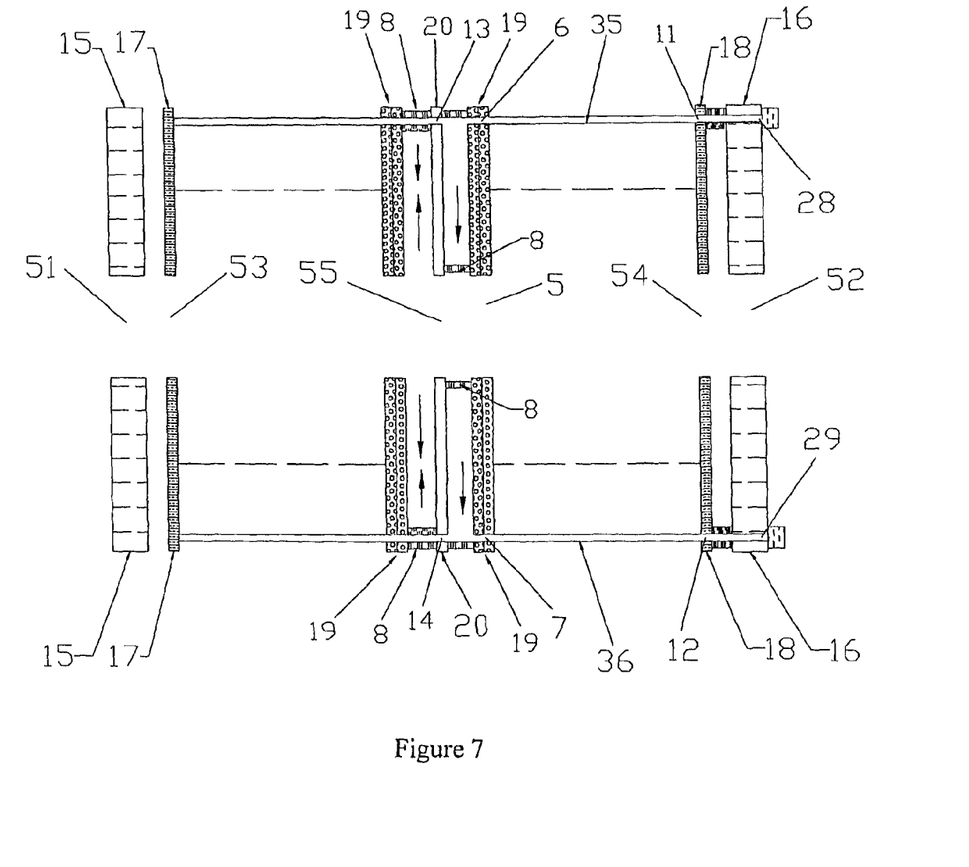
FIG. 7 is a schematic view illustrating a fuel cell stack according to the present invention.

According to a fourth embodiment of the present invention, as shown in FIG. 7, the fuel cell stack further comprises end plates 15 and 16, current conducting plates 17 and 18, a membrane electrode 20 and a seal member 8. A center hole 51, 52, 53, 54 and 55 is formed at the center of each one of the end plates 15 and 16, current conducting plates 17 and 18 and the membrane electrode 20 respectively. Each one of the end plate 16, current conducting plate 18 and membrane electrode 20 comprises an inlet 28, 11 and 13 respectively corresponding to the inlet 6 in the flow-field plate 19, and also comprises an outlet 29, 12 and 14 respectively corresponding to the outlet 7 in the flow-field plate 19. The inlets 28, 11, 6 and 13 form a communicative input path 35 in the fuel cell stack, and the outlets 29, 12, 7 and 14 form a communicative output path 36 in the fuel cell stack. The seal members 8 are respectively placed around the inlet 6 and outlet 7 on the side of the flow-field plate 19 having flow grooves extending radially from the center hole 5, and around the center hole 5 and the outer edge of flow-field plate on the other side of flow-field plate 19.

In general, the flow-field plate 19 may be a single plate, or may be formed with two plates tightly boned together. In the case of a single plate, said "a side" and "the other side" of the flow-field plate are the two surfaces of the single plate. In the case that the flow-field plate 19 is formed with two plates tightly boned together, said "a side" and "the other side" of the flow-field plate are the two surfaces of the resulted flow-field plate from two plates bonded together.

The end plates 15 and 16, current conducting plates 17 and 18, flow-field plate 19 and membrane electrode 20 may be various shapes, such as circle, ellipse or polygon, preferably circle, rectangle or ellipse. The center hole, inlet and outlet in the end plate, current conducting plate, flow-field plate and membrane electrode may also be various shapes, such as circle, ellipse or polygon, preferably circle, hexagon or square. Furthermore, the size of the center hole, inlet and outlet may be determined as desired as long as it could meet the flow of oxidant or fuel.

The end plates 15 and 16 may be formed from such materials as aluminum, stainless steel, titanium or engineering plastic. The current conducting plates 17 and 18 may be formed from such materials as copper, stainless steel, titanium, silver, gold or graphite to lead out current and output electric power. The flow-field plate 19 may be made from conductive materials, such as graphite and metal, e.g. Ti, Nb, Al, Cu, stainless steel, Au and Ag. The membrane electrode 20 may be comprised of a cathode diffusion layer, a anode diffusion layer, a catalyst layer carries on the diffusion layer and a PEM, wherein its composition, structure and materials are known to those skilled in the art. The seal member 8 may be made from various elastic material, for example at least one selected from the group consisting of osmotic sol plastic, rubber, resin, polyurethane, polyester, polyimide and foam material.

Since the end plate 16, current conducting plate 18, flow-field plate 19 and membrane electrode 20 may be provided respectively with inlet 28, 11, 6, 13 and outlet 29, 12, 7, 14 corresponding to each other in terms of position, shape and size, the input path 35 and output path 36 may be formed in the fuel cell stack for transportation of fuel or oxidant.

Preferably, the fuel cell stack further comprises a fixing device for assembling the end plates 15 and 16, current conducting plates 17 and 18, a plurality of flow-field plates 19 and a plurality of membrane electrodes 20 into a whole.

According to a fifth embodiment of the present invention, the fixing device comprises plates 81, 83 and a plate 82. The plates 81 and 83 are tightly attached to the end plates 16 and 15 respectively. The plate 82 may be connected with the plates 81 and 83 by various known types of mechanical connection, such as thread connection, welding, adhesion, etc., to connect the plates 81, 82 and 83 together into a closed case. Thread connection is preferred to connection the plates 81 and 83 together. Furthermore, the plate 81 has openings 31 and 32 corresponding to the inlet 28 and outlet 29 in the end plate 16 respectively. The opening 31 is used as the inlet of oxidant, and the opening 32 is used as the outlet of oxidant. In addition, the plate 81 also has at least one opening 24 to connect to the center hole 52 of the end plate 16. The opening 24 is used to supply fuel into the case and discharge the reaction resultants out of the fuel cell stack.

Figure 8:
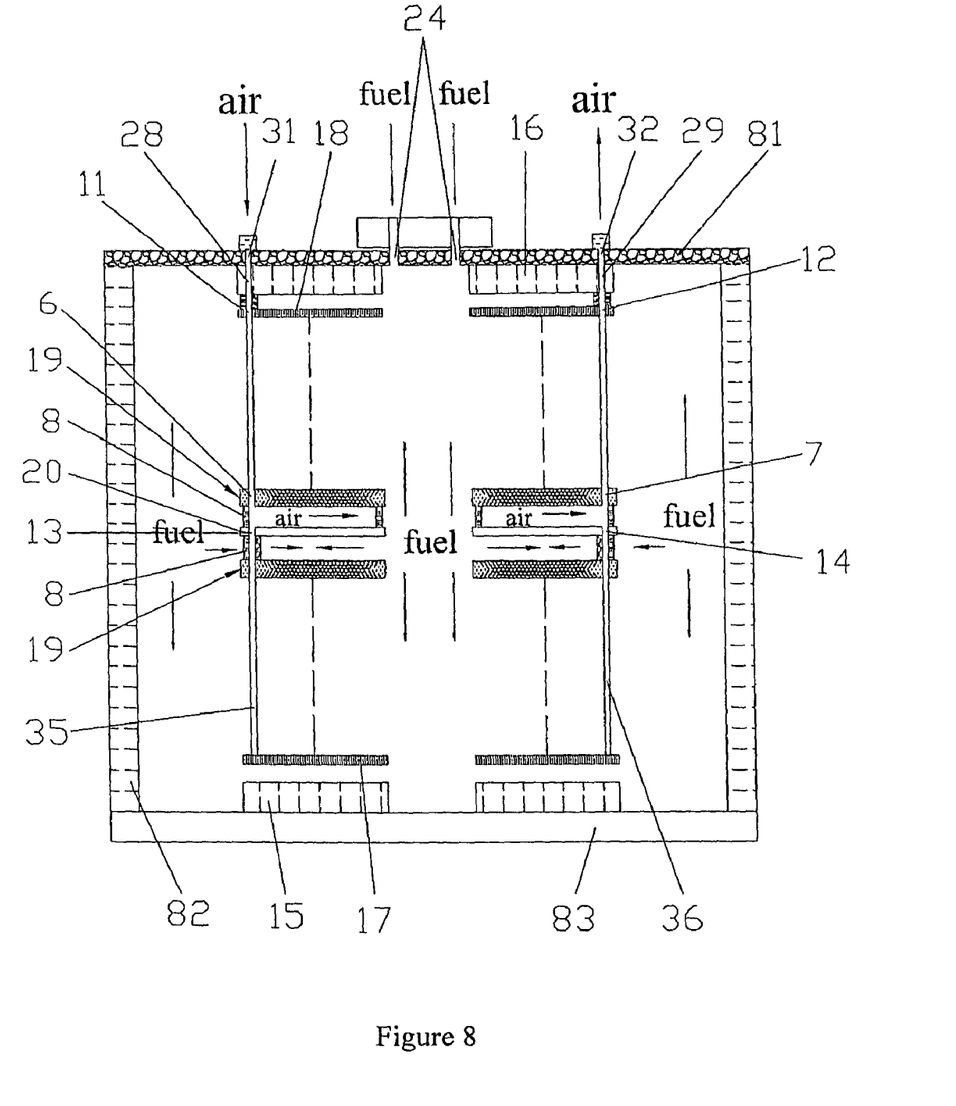
FIG. 8 is a schematic view illustrating a fuel cell stack according to the present invention.

Thus, in the case of fixing the fuel cell stack with plates 81, 83 and 82, the plates 82 and 83 may be connected together by thread connection, and then the end plate 15, current conducting plate 17, a plurality of flow-field plates 19, a plurality of membrane electrodes 20, current conducting plate 18 and end plate 16 are arranged in order in the case. Subsequently, the plates 81 and 82 are connected together by thread connection. In this case, the size of plates 81, 82 and 83, and the shape and size of the case enclosed by these plates may be changed as desired. During these processes, it should ensure that the plates 81 and 83 are attached tightly to end plates 16 and 15 respectively, and that the inlets 6, 13, 11 and outlets 7, 14, 12 in a plurality of flow-field plates 19, a plurality of membrane electrodes 20 and current conducting plate 18 respectively are aligned and communicate respectively with the inlet 28 and outlet 29 in the end plate 16 and openings 31 and 32 in the plate 81, to form the input path 35 and output path 36 for oxidant transportation. Finally, fuel will be supplied into the case through the opening 24 in the plate 81 to fill the whole case with fuel. The structure of the fuel cell stack assembled as mentioned above is shown in FIG. 8. As can be seen from this figure, the fuel cell stack with said fixing device has advantages of its simple structure and convenient assembling by the way of integration of fuel case and fuel cell stack. Furthermore, since the input path and output path for oxidant transportation are separated from each other, a concentration gradient for oxidant diffusion can be formed to promote the oxidant diffusion.

In this fuel cell stack, the side of flow-field plate 19 having flow grooves extending radially is used as the surface for fuel diffusion to distribute the fuel passing through the center hole uniformly on the entire flow-field plate. Seal members 8 are respectively arranged around the inlet 6 and outlet 7 on this side of flow-field plate to prevent oxidant from leaking out towards the fuel electrode, as shown in FIG. 3. While the other side of flow-field plate 19 having flow grooves distributing around the center hole 5 and communicating with the inlet 6 and outlet 7 is used as the surface for oxidant diffusion to distribute the oxidant passing through the inlet into this side uniformly on the entire flow-field plate and to finally gather in the outlet. Furthermore, seal members 8 are respectively arranged around the center hole 5 and the outer edge of flow-field plate on this side of flow-field plate to isolate oxidant, which can prevent oxidant from diffusing to the fuel electrode for reacting directly with fuel, as shown in FIG. 6.

In the case of fixing the fuel cell stack by plates 81, 82 and 83, fuel may be supplied into the fuel cell stack through at least one opening 24 in the plate 81, and diffuse through the center hole to the side of each flow-field plate having flow grooves radially extending. Then, fuel may diffuse to each part of the side through flow grooves extending radially from the center hole 5 to the outer edge, to electrochemically react with oxidant on the other side of flow-field plate having flow grooves distributing around the center hole 5 and communicating with the inlet 6 and outlet 7. Since each plate of the fuel cell stack has a center hole, a communicative path may be formed at the center of the whole fuel cell stack. Therefore, fuel may diffuse to any area of the fuel cell, and resultants generated from reaction may also be discharged out of the fuel cell stack through the opening 24 in the plate 81. During these processes, there is no carbon dioxide as a resultant gathered in the grooves due to no "dead-end" on the flow-field plate.

Oxidant, for example air or oxygen, may flow into the fuel cell stack through the input path 35 via the opening 31 in the plate 81. As the input path and output path for oxidant transportation are separated from each other, a concentration gradient for oxidant diffusion may be formed, which is benefit for oxidant to diffuse to the side of flow-field plate having flow grooves distributing around the center hole 5 and communicating with the inlet 6 and outlet 7. Then, oxidant may diffuse to each part of the side through flow grooves distributing around the center hole 5 and communicating with the inlet 6 and outlet 7, to electrochemically react with the fuel on the other side of flow-field plate having flow grooves extending radially. Resultants generated from reaction and unreacted reactants may gather in the output path 36 and finally be discharged out of the fuel cell stack through the opening 32 in the plate 81. During these processes, water blocked in the grooves and nitrogen collection would not occur due to no "dead-end" on the flow-field plate.

According to a sixth embodiment of the present invention, the fixing device comprises a bolt 22 passing through the center holes 51, 52, 53, 54, 5 and 55 in the end plates 15 and 16, current conducting plates 17 and 18, a plurality of flow-field plates 19 and a plurality of membrane electrodes 20, and two nuts 23 on both ends of the bolt 22. The nuts 23 have openings 30 as diffusion paths for supplying oxidant to the fuel cell stack. The size of openings 30 may be suitable to the structure of fuel cell stack, and at least ensure sufficient oxidant flowing in and out. The size of bolt 22 and nut 23 may be suitable to the structure of fuel cell stack, and at least ensure fastening the fuel cell stack.

Figure 9:
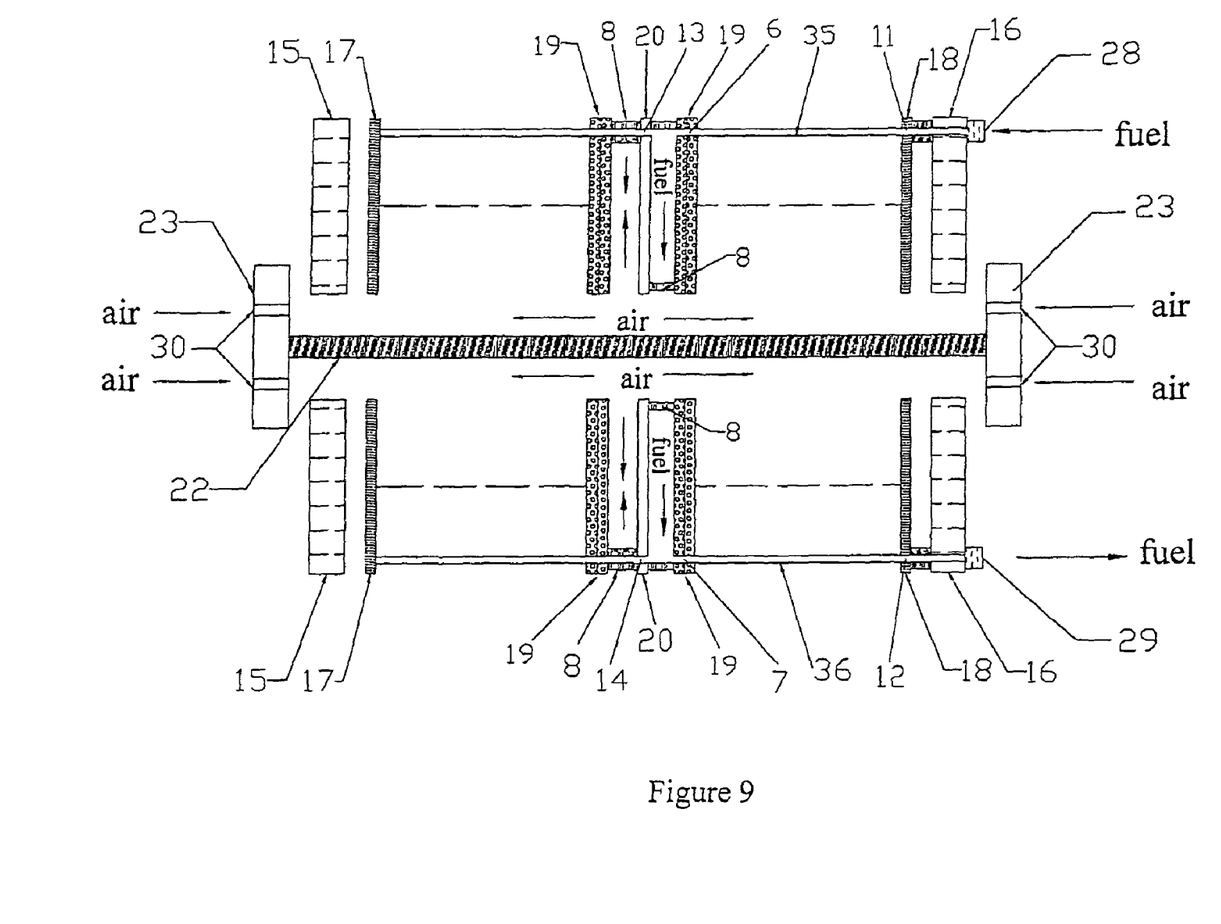
FIG. 9 is a schematic view illustrating a fuel cell stack according to the present invention.

Therefore, in the case of fastening the fuel cell stack with the bolt 22 and nuts 23, a nut 23 may firstly be threaded with the bolt 22, and then the bolt 22 may pass through the center holes on each plate of end plate 15, current conducting plate 17, a plurality of flow-field plates 19 and membrane electrodes 20, current conducting plate 18 and end plate 16 in order. During this process, it must be noted that the inlets 6, 13, 11 and outlets 7, 14, 12 in a plurality of flow-field plates 19, a plurality of membrane electrodes 20 and current conducting plate 18 should align and communicate with the inlet 28 and outlet 29 in the end plate 16 respectively to form the input path 35 and output path 36 for fuel transportation. Finally, another nut 23 may be threaded with the bolt 23 to finish assembling. The structure of the fuel cell stack assembled as mentioned above is shown in FIG. 9. As can be seen from FIG. 9, the bolt is separated from the fuel path in the fuel cell stack with this fixing device. Therefore, fuel may flow hermetically in the fuel cell stack without contact with the bolt, so that the bolt cannot be corroded and fuel cannot be polluted. Furthermore, a concentration gradient for fuel diffusion may be formed due to the separation of fuel input and output paths, which is benefit for fuel diffusion.

In this fuel cell stack, the side of flow-field plate 19 having flow grooves extending radially is used as the surface for oxidant diffusion to distribute the oxidant passing through the center hole uniformly on the entire flow-field plate. Seal members 8 are respectively arranged around the inlet 6 and outlet 7 on this side of flow-field plate to prevent fuel from leaking out towards the oxidant electrode, as shown in FIG. 3. While the other side of flow-field plate 19 having flow grooves distributing around the center hole 5 and communicating with the inlet 6 and outlet 7 is used as the surface for fuel diffusion to distribute the fuel passing through the inlet into this side uniformly on the entire flow-field plate and to finally gather in the outlet. Furthermore, seal members 8 are respectively arranged around the center hole 5 and the outer edge of flow-field plate on this side of flow-field plate to isolate fuel, which can prevent fuel from diffusing to the oxidant electrode for reacting directly with oxidant, as shown in FIG. 6.

In the case of fastening the fuel cell stack with the bolt 22 and nuts 23, oxidant, for example air or oxygen, may flow into the fuel cell stack in a natural convective manner, and diffuse through the center hole to the side of each flow-field plate having flow grooves extending radially. Then, oxidant may diffuse to each part of the side through flow grooves extending radially from the center hole to the outer edge, to electrochemically react with the fuel on the other side of flow-field plate having flow grooves distributing around the center hole 5 and communicating with the inlet 6 and outlet 7. Since each plate of the fuel cell stack has a center hole, a communicative path may be formed at the center of the whole fuel cell stack. Therefore, oxidant may diffuse to any area of the fuel cell, and the fresh oxidant for further reaction may be supplied into the fuel cell stack in time. Resultants generated from reaction and unreacted reactants may be discharged out of the fuel cell stack, so that water blocked in the grooves and nitrogen collection would not occur.

Fuel may be supplied into the fuel cell stack through the input path 35 via the inlet 28 in the end plate 16. A concentration gradient for fuel diffusion may be formed due to the separation of fuel input and output paths, which is benefit for fuel to diffuse to the side of flow-field plate having flow grooves distributing around the center hole 5 and communicating with the inlet 6 and outlet 7. Then, fuel may diffuse to each part of the side through flow grooves distributing around the center hole 5 and communicating with the inlet 6 and outlet 7, to electrochemically react with oxidant on the other side of flow-field plate having flow grooves extending radially. The fuel after reacted may gather in the output path 36 and finally be discharged out of the fuel cell stack through the outlet 29 in the end plate 16. During these processes, there is no carbon dioxide as a resultant gathered in the grooves due to no "dead-end" on the flow-field plate.

Figure 10:
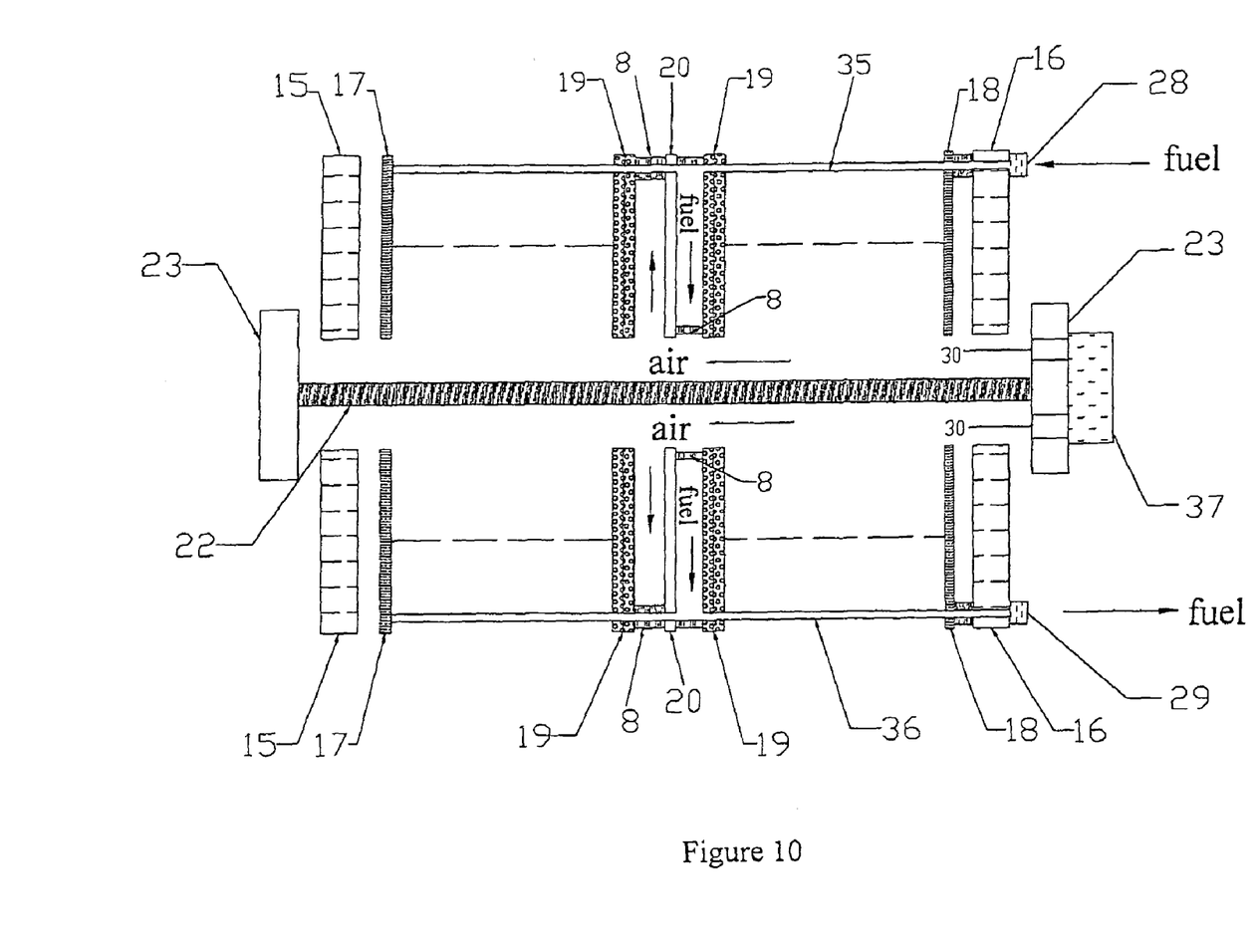
FIG. 10 is a schematic view illustrating a fuel cell stack according to the present invention.

FIG. 10 is a schematic view illustrating a fuel cell stack according to another embodiment of the present invention. In this embodiment, oxidant may be supplied by a blower 37 instead of in a natural convective manner. The blower 37 may be mounted outside one of the nuts 23, while an opening 30 may be formed or not on the other nut 23 opposite to the blower 37. The remaining of this embodiment may be similar to the embodiment shown in FIG. 9. Therefore, the fuel cell stack according to the present invention may also comprise the blower 37 mounted outside the nut 23.

What is claimed is:

1. A fuel cell stack, comprising:
   a flow-field plate, comprising
   a center hole formed at the center of the flow-field plate;
   an inlet and an outlet formed on two positions near the outer edge of the flow-field plate; and
   flow grooves extending radially in a linear radial form from the center hole to approximately the outer edge of the flow-field plate on one side of the flow-field plate, wherein the fuel cell stack further comprises end plates, current conducting plates, membrane electrode and seal members; a center hole is formed at the center of each one of the end plates, current conducting plates and membrane electrode; each one of the end plate, current conducting plate and membrane electrode comprises an inlet respectively corresponding to the inlet in the flow-field plate, and also comprises an outlet respectively corresponding to the outlet in the flow-field plate; the seal members are provided around the inlet and outlet on the side of the flow-field plate having flow grooves extending radially from the center hole, and around the center hole and the outer edge of the flow-field plate on the other side of the flow-field plate respectively.

2. The fuel cell stack according to claim 1, wherein the fuel cell stack further comprises a fixing device.

3. The fuel cell stack according to claim 2, wherein the fixing device comprises plates and a plate connected to the plates, the plates are tightly attached to the end plates respectively, the plate comprises openings corresponding to the inlet and outlet in the end plate respectively, and at least one opening communicating with the center hole in the end plate.

4. The fuel cell stack according to claim 2, wherein the fixing device comprises a bolt passing through the center holes in the respective plates and nuts threaded with both ends of the bolt, and the nut comprises an opening.

5. The fuel cell stack according to claim 4, wherein the fuel cell stack further comprises a blower mounted outside of a nut, another nut opposite to the blower comprises an opening or does not comprise an opening.

6. The flow-field plate according to claim 1, wherein a first reactant flows from the center hole towards the outer edge of the flow-field plate via the flow grooves on the one side of the flow-field plate.

7. The fuel cell stack according to claim 1, wherein the flow-field plate has a circular shape, a rectangular shape or an elliptical shape.

8. The fuel cell stack according to claim 1, wherein the positions of the inlet and the outlet in the flow-field plate are symmetrical with respect to the center hole.

9. The fuel cell stack according to claim 1, wherein the ratio of the total area of all flow grooves bottom on the one side of the flow-field plate to the entire surface area of the same side of the flow-field plate where the flow grooves are ranges between 1/3 and 4/5.

10. The fuel cell stack according to claim 1, wherein the ratio of the depth of flow grooves on the one side of the flow-field plate to the thickness of the flow-field plate ranges between 1/5 and 1/2.

11. The fuel cell stack according to claim 1, wherein the flow-field plate further comprises flow grooves distributing around the center hole and communicating with the inlet and the outlet on the other side of the flow-field plate.

12. The fuel cell stack according to claim 11, wherein the flow grooves on the other side of the flow-field plate distribute corresponding to the shape of the flow-field plate.

13. The fuel cell stack according to claim 11, wherein the flow grooves on the other side of the flow-field plate are in an arc form.

14. The fuel cell stack according to claim 11, wherein the ratio of the total area of all flow grooves bottom on the other side of the flow-field plate to the entire surface area of the same side of the flow-field plate where the flow grooves are ranges between 1/3 and 4/5.

15. The fuel cell stack according to claim 11, wherein the ratio of the depth of flow grooves on the other side of the flow-field plate to the thickness of the flow-field plate ranges between 1/5 and 1/2.

16. The flow-field plate according to claim 11, wherein a second reactant flows from the inlet towards the outlet via the flow grooves on the other side of the flow-field plate.

* * * * *